(12) United States Patent
Hernandez (10) Patent No.: US 9,604,440 B2
(45) Date of Patent: Mar. 28, 2017

(54) MANUFACTURING PROCESS FOR THE PRODUCTION OF FLEXIBLE THREE-DIMENSIONAL ITEMS

(75) Inventor: Adrian Hernandez Hernandez, Elche (ES)

(73) Assignee: SIMPLICITY WORKS EUROPE, S.L., Elche (ES)

( * ) Notice: Subject to any disclaimer, the term of this patent is extended or adjusted under 35 U.S.C. 154(b) by 421 days.

(21) Appl. No.: 14/349,952

(22) PCT Filed: Mar. 6, 2012

(86) PCT No.: PCT/ES2012/070139
§ 371 (c)(1),
(2), (4) Date: May 5, 2014

(87) PCT Pub. No.: WO2013/050634
PCT Pub. Date: Apr. 11, 2013

(65) Prior Publication Data
US 2014/0246147 A1    Sep. 4, 2014

(30) Foreign Application Priority Data

Oct. 5, 2011    (WO) ............... PCT/ES2011/070692

(51) Int. Cl.
| B32B 38/00 | (2006.01) |
| A43B 23/02 | (2006.01) |
| A43B 23/04 | (2006.01) |
| B29D 35/02 | (2010.01) |
| B29D 35/12 | (2010.01) |

(52) U.S. Cl.
CPC ...... *B32B 38/0004* (2013.01); *A43B 23/0245* (2013.01); *A43B 23/04* (2013.01); *B29D 35/02* (2013.01); *B29D 35/126* (2013.01)

(58) Field of Classification Search
CPC ................................................. B32B 38/0004
USPC ....................................................... 156/245
See application file for complete search history.

(56) References Cited

U.S. PATENT DOCUMENTS

| 3,552,039 | A |   | 1/1971 | Fukuoka |
| 3,672,078 | A |   | 6/1972 | Fukuoka |
| 3,720,971 | A |   | 3/1973 | Wyness |
| 3,952,358 | A |   | 4/1976 | Fukuoka |
| 2003/0233771 | A1 |   | 12/2003 | Soon |
| 2012/0090103 | A1 | * | 4/2012 | Hernandez Hernandez ......... A43B 23/0215 12/142 R |

FOREIGN PATENT DOCUMENTS

| AT | 385716 B | 5/1988 |
| ES | 8105945 A1 | 9/1981 |
| ES | 2346393 A1 | 10/2010 |

* cited by examiner

*Primary Examiner* — Daniel Lee
(74) *Attorney, Agent, or Firm* — Lucas & Mercanti, LLP (57) ABSTRACT

Manufacturing process for the production of flexible three-dimensional items which entails: cutting the pieces (4) which will form the outer material of the item to be produced, preparing a mould (1) and a counter mould (3) with smooth opposing surfaces onto which the cut pieces (4) which will form the outer material are placed, these cut pieces, alongside the mould and counter mould, delimiting a network of channels (6) through which a molten plastic material is injected.

12 Claims, 11 Drawing Sheets

MANUFACTURING PROCESS FOR THE PRODUCTION OF FLEXIBLE THREE-DIMENSIONAL ITEMS

CROSS-REFERENCE TO RELATED APPLICATIONS

This application is a 371 of PCT/ES2012/070139 filed Mar. 6, 2012, which in turn claims the priority of PCT/ES2011/070692 filed Oct. 5, 2011, the priority of both applications is hereby claimed and both applications are incorporated by reference herein.

INVENTION FIELD

The present invention refers to a manufacturing process for the production of flexible three-dimensional items such as footwear, clothing and bags, etc.—in other words, for the production of all items made from cut pieces of flexible material (for example natural and artificial leather) joint together at their adjacent edges.

The invention process applies to the manufacture of items of the abovementioned nature, which may have a lining and just like the item's outer material, may be made from cut pieces of flexible material joint together at their adjacent edges.

More specifically, the invention process is designed for the manufacture of items of the abovementioned nature, using a mould and counter mould. The cut pieces which will form the outer material are arranged in this mould and the cut pieces which will form the lining in the counter mould. They are joined together with a plastic material injected between the mould and counter mould. Using this process, the cut pieces which will form the item's outer material and lining are joined seamlessly.

BACKGROUND OF THE INVENTION

This type of footwear manufacturing process is described in the applicant's own PCT application, ES 2010/000108.

According to this application, the process entails cutting the pieces which will form the upper and preparing a mould and counter mould between which the volume required for both the upper and the sole of the footwear is calculated.

The mould comprises at least two parts in order to ensure that when these parts are separated, the mould remains open to allow the cut pieces which will form the upper to be introduced. The same applies to the counter mould, which will take on the form of the footwear last. Small ridges stick out from the inner surface of the mould, no higher up than the depth of the cut pieces which will form the upper. The ridges delimit the areas coinciding with the outline and position of the cut pieces in the formation of the footwear upper.

The cut pieces which will form the upper are then placed on the aforementioned areas, upside facing the mould, before the last is inserted and the mould is closed. The mould, last and cut pieces which will form the upper delimit a network of channels which lead to specific spaces between the mould and last, such as the space where the sole would be. A molten plastic material is then injected into the mould, which fills all the channels and spaces and comes into contact with the cut pieces which will form the upper in order to bind them together once it has cooled down.

Upon opening the mould, a seamless item of footwear is produced; all the cut pieces are separated by ridges corresponding to the path created by the aforementioned channels; these ridges serve to bind the cut pieces which form the upper together.

The process described is disadvantageous in that each mould can only be used to manufacture one footwear model, whose upper and position is formed by a fixed number of cut pieces. This makes the process more expensive given that a new mould is required for each footwear design.

With the process described, the use of a lining comprising one single cut piece is being considered; this lining would be a prefabricated kind of sock which would be applied to the last. This would make the manufacturing process more expensive and complicates the use of leather or non-stretch materials in the lining.

INVENTION DESCRIPTION

The object of the present invention is a manufacturing process for the production of three-dimensional items, such as footwear, clothing and accessories, etc., which are made of flexible cut pieces and whose intrinsic properties make it possible to eliminate the abovementioned problems.

The invention process begins in the same way as the process described above, by cutting the pieces which will form the outer material of the three-dimensional item to be produced and preparing the mould and counter mould. The counter mould will reproduce the volume of the three-dimensional item to be manufactured. For example, when manufacturing footwear, the counter mould takes on the faint of a last; when manufacturing clothing, for example gloves, trousers, jackets, etc., it takes on the form of the garment's corresponding body part. For the manufacture of bags, it takes on the form of the bags' internal volume, etc.

According to the invention, neither the mould nor counter mould have projections or ridges on their opposing surfaces in the area where the cut pieces which form the outer material are to be placed, in such a way that they delimit, along with the surface of the mould and counter mould, a network of channels which coincide with the lines separating the consecutive cut pieces which form the outer material. A plastic material is usually injected into these channels.

Furthermore, the mould and counter mould delimit a cavity corresponding to the volume of the aggregate of the cut pieces which will form the outer material which is limited by surfaces without projections, thus enabling the use of the mould with various sizes and outlines of cut pieces and even with a varying number of cut pieces. This makes it possible to produce different product models or designs with the same mould. Moreover, the absence of ridges makes it possible to arrange the cut pieces which form the outer material with the opposing edges of adjacent cuts touching, therefore the cut pieces which form the three-dimensional item produced will not be separated by ridges.

In general, the outer material will be made of cut pieces of leather alone. These cut pieces are arranged on the inner surface of the mould. The outer material may also have a lining which likewise comprises separate cut pieces arranged on the outer surface of the counter mould.

The consecutive cuts of leather may be arranged in such a way that their adjacent edges touch or may be separated slightly. This separation delimits the network of channels along with the inner surface of the mould and counter mould or lining. The plastic material is injected through these channels.

In either case, the cuts of leather may have sheared edges which serve to delimit, along with the opposing surface of the mould and counter mould or lining, the network of channels through which the plastic material is injected.

Either the upside or the base side of these cuts may be sheared, as later illustrated. Shearing increases surface contact between the cut pieces forming the outer material and the injected plastic material, thereby increasing the binding area.

The upside refers to the leather surface intended to be seen and the base side refers to the opposite surface of the leather.

The wider the shearing, the greater the surface contact achieved. However, given that it is important to guarantee breathability, it is necessary to reach a compromise between adhesion and breathability.

The line separating the cuts of leather and the line separating the cuts of leather which will form the lining may coincide, thus enabling the injected plastic material to bind the aggregate of these cuts together.

The outer material may consist of cut pieces which vary in bulk, the bulkier cut pieces sticking out further than the less bulky cuts in the surface of the item produced.

Furthermore, the mould may have channels, coinciding with the gaps between the consecutive cuts of leather, which are wider than said gaps and together form a network of channels through which the plastic material is injected.

According to the invention, in order to ensure adhesion between the cut pieces forming the outer material and the injected plastic material, an adhesive substance, similar to or compatible with the plastic material to be injected, may be applied to the sheared edges of these cut pieces. Applying adhesive to these sheared edges ensures a high-strength bond between the various cut pieces which form the outer material.

Once all the cut pieces which will form the outer material have been placed, the counter mould is fitted inside the mould which rests on the upside of the cut pieces. If the base side of the cut pieces are sheared, the counter mould delimits a network of channels along with the adjacent sheared edges of the consecutive cut pieces which, in the case of footwear, will lead to or end in the space where the sole would be. If the upside of the material is sheared, the surface of the mould delimits the abovementioned network of channels along with the adjacent edges of the consecutive cut pieces. Furthermore, in this case separation ridges will appear between the cut pieces which form the outer material of the finished item.

Once the counter mould has been placed, the mould is closed and the plastic material is injected into it, until all the abovementioned channels are filled and also the space where the sole would be, whereby footwear is concerned. Various types of plastic material may be used for both purposes.

The plastic material used may vary in type and nature, for example the type of thermoplastic, thermostable, etc. it may also be injected via any injection system.

Once the injected plastic material has solidified, the mould is opened and the item produced is removed; the counter mould is also taken out of the item.

Regardless of the type of plastic injected to fill the channels between the cut pieces which form the outer material and the surfaces of the mould and counter mould, ridges which form a skeleton to bind the cut pieces together are created.

If the base side of the cut pieces which form the outer material are sheared, the aforementioned ridges will not be visible on the exterior of the item produced. On the other hand, if the aforementioned ribs are made on the upside of these cut pieces, the ridges will be visible on the outer surface of the footwear or garment produced.

The sole of the footwear manufactured may be formed normally, be injected with rubber or be made of components incorporated into the mould as an attachment, for example leather soles, heels and air pockets, etc. This sole is then attached to the very edges of the ridges formed by the injected plastic material and the adjacent edge of the cut pieces which form the outer material.

The cut pieces which will form the outer material may also be stuck to the corresponding surfaces of the mould using an adhesive which can be easily removed from the three-dimensional item's surface after production. It is also possible to attach them using suction through small holes made in the mould winch lead to its inner surface and are connected to a suction or air extraction system.

The suction adhesive system may also serve the rapid placement of the cut pieces.

The abovementioned adhesion systems may also be used in the counter mould, thus making it possible to make the lining without seams.

The invention process facilitates the manufacture of a finished end product which looks like a traditional item but which also has a unique trait in that there are no bonding seams between the cut pieces which form the outer material. The item would only have seams, which may or may not coincide with the line separating the various cut pieces of the outer material, for decorative purposes. Furthermore, reinforcement seams may be used in order to prevent separation at fragile points.

The invention process enables several models to be developed using the same base, that is to say, by using the same volume, defined by the same mould and counter mould but with varying cut pieces. This option reduces modelling and development costs substantially, since the base of the mould, which is the most expensive part, is kept, thereby enabling various models to be produced. Moreover, part of the area delimited between the mould and counter mould may be filled with a filler part or a partially enhanced counter mould volume, which serve to limit the volume accorded to the cut pieces which will form the outer material.

The cut pieces which will form the outer material may be attached, prior to their arrangement on the mould, to a flexible laminated template, arranged in the same way as they would be in the finished item. This template, with the cut pieces which will form the outer material stuck to it, takes on the form of the mould's inner surface.

The use of this template enables the use of moulds comprising two or more parts, in which the lines separating two of these parts might cross one of the cut pieces.

In order to arrange the cut pieces which will form the outer material in such a way that their edges meet, a printed plastic template may be used. A transparent paper with one adhesive side and one printed side is proposed. On the punted side, the outlines and corresponding reference numbers of each cut of leather can be found if necessary. The cuts of leather would be stuck one by one, in order, onto the adhesive side, thus saving time spent placing them outside of the mould, so that when the mould is open, this template, which may be three-dimensional just like the counter mould, must simply be placed. This emulates a transparent guide template. Once the plastic material has been injected and solidifies, the plastic template must be removed.

The same process may be applied to placing the cut pieces which form the lining if necessary.

Another advantage of the invention process is that it makes it possible to fabricate models in which the plastic material to be injected enables the creation of flexible, somewhat elastic, ridges which facilitates greater adaption to the body's surface and also to the changes that occur during movement, particularly at the joints. For this reason, the manufacture of products with various injected plastic materials is feasible, given that some products would require greater elasticity whilst others would require greater resistance. This creates the need for the moulds to be developed according to the number of pieces needed to form the outer material, the type of materials to be injected and how they would be arranged in the final product to be produced.

Furthermore, the invention process makes it possible to mechanise manufacturing, given that the machinery is developed specifically for this manufacturing process. Whereby the mould openings are improved, the cut pieces which will form the outer material can be robotically placed and following this, the various components can be opened and removed robotically or mechanically.

In the invention process, the cut pieces which form the outer material may be applied by means of flat sewing prior to injection, for instance for decorative purposes. However, no seams are needed to construct the main structure of the outer material. It may even be possible to sew some points before or after the item has been extracted but only in order to reinforce the fragile areas such as flex points or in some cases and areas, for decorative purposes.

Moreover, the invention process makes it possible to incorporate a leather or fabric lining to coat the mould prior to the injection of the plastic material. An item comprising an outer material and lining is thereby achieved, whilst the ridges of injected plastic material between them remains hidden. Therefore, when looking at the items' interior, only the lining would be visible and not the base side of the leather cut or the ridges of injected plastic material; the lining would be stuck to the ridges. Adhesive may also be applied to the base side of the leather to ensure that it is stuck to the outer material in a uniform manner; the adhesive used should not prevent the leather from breathing.

Just like the item's outer material, the lining may consist of separate cut pieces arranged on the counter mould and may be stuck to it temporarily using a light fixation adhesive via a vacuum system similar to that described for the mould, with holes leading to the surface of the counter mould, connected to a piece of vacuum equipment, etc.

The lines which separate the lining pieces may coincide with at least some of the channels delimited between the cut pieces, which form the outer material, in such a way that the plastic material injected into these channels also serves to bind the cut pieces forming the lining.

In the initial stages, both the cut pieces which form the outer material and the cut pieces which form the lining may optionally be stuck to a sheet or film made of electrostatically charged plastic material, this static causing it to stick to the inner surface of the mould or counter mould. This system will simplify the placement of the cut pieces which will form the outer material on the mould and of the cut pieces which will form the lining on the counter mould significantly.

There is a risk, in certain cases, of some of the plastic injected to bind the cut pieces forming the outer material, seeping through onto the external surface, that is to say onto the upside.

This risk can be avoided by treating the surface of the mould, outer side of the cut pieces which form the outer material and/or the inner surface of the template to which the cut pieces forming the outer material are placed. The surface of the mould and template can then repel the injected plastic material, thus preventing it from seeping through onto the upside of the cut pieces which form the outer material. For example, a temporary or silicone coating may be applied to those areas of the mould surface onto which the cut pieces forming the outer material will be arranged. Similarly, a silicone based adhesive, or any other material which repels the specific type of plastic to be injected, may be applied to the surface of the template to which the cut pieces forming the outer material are arranged. Finally, it is also possible to apply a kind of silicone or wax that chemically repels the plastic material to be injected to the upside of the cut pieces material, which form the outer material and lining.

The same problem may arise when the lining is applied to the counter mould. This could be resolved in the same way as described above for the outer material, that is to say by applying a substance which repels the plastic material to be injected to the surface of the counter mould and/or the inner surface of the lining.

As already indicated, the mould will comprise two or more parts, their separate nature facilitating the easy placement of the cut pieces which will form the outer material in the inner surface, using any of the abovementioned systems.

In addition, at least in certain areas of the item to be produced, some parts of the mould may be moved outside the adjacent parts of the mould itself. Therefore, the volume delimited between the mould and counter mould may vary in certain areas, for example to facilitate the expansion of the plastic material injected into them as it solidifies. This possibility is valid for the part of the mould corresponding to the sole for example in the manufacture of footwear, as well as in the manufacture of those areas of clothing which are thicker than their adjacent areas, such as collar and cuffs, etc. Plastics which can expand and solidify with an additional reagent are naturally used for such purposes.

Moreover, certain parts or components of the item to be produced may be reinforced, if necessary, by inserting rigid and resistant parts, for example made of metallic material, into the item's interior. This type of reinforcement applies to the manufacture of heels and waists in footwear, for example.

BRIEF DESCRIPTION OF THE FIGURES

The invention manufacturing process is represented in the accompanying figures intended to serve as a non-limiting example and wherein.

DETAILED DESCRIPTION OF ONE EMBODIMENT

The characteristics and advantages of the invention process may be better understood with the following description of one possible embodiment, applied to the manufacture of footwear in FIGS. 1 to 17 and to the manufacture of clothing items in FIGS. 27 to 32.

Figure 1:
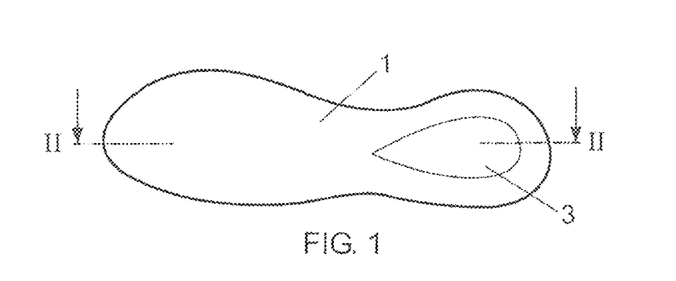
FIG. 1 is an overhead view of a counter mould used in the manufacture of footwear representing the invention process.
Figure 2:
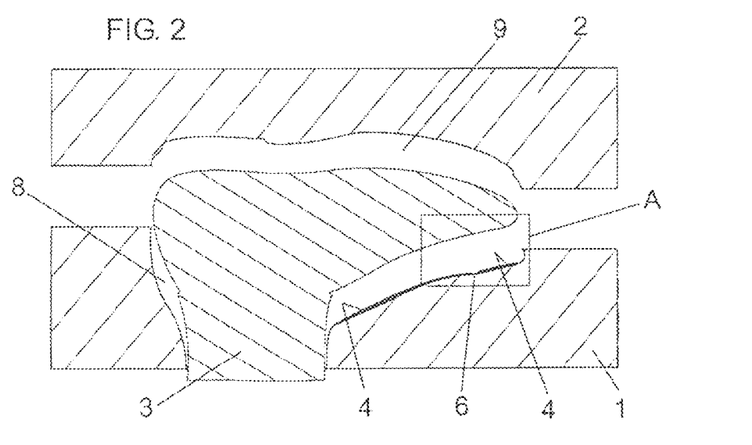
FIG. 2 is a longitudinal section of the mould and counter mould used in the manufacture of footwear, taken according to the cut line II-II in FIG. 1.
Figures 3, 4:
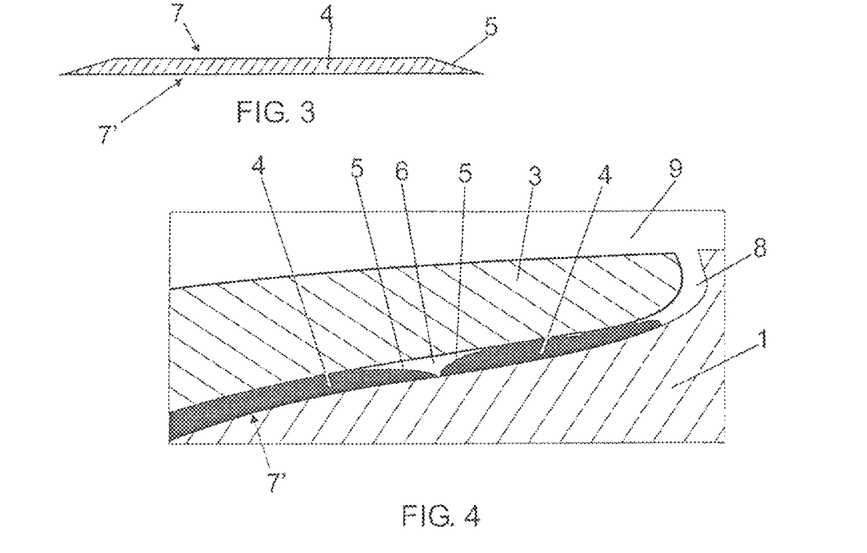
FIG. 3 is a cross section of one of the cut pieces which will form the footwear upper.
FIG. 4 is an enlarged representation of detail A in FIG. 2, representing the cut pieces which will form the upper arranged on the inner surface of the mould and counter mould inside it.

The manufacture of footwear with the invention process is carried out with a mould and counter mould, represented in FIGS. 1, 2 and 4.

In the example depicted in the drawings, the mould comprises two independent parts 1 and 2 and the counter mould 3 consists of a last. Once the last 3 has been placed inside part 1 and part 2 is coupled to part 1, in such a way that the mould is closed, a space or volume corresponding to the upper and sole of the footwear to be produced is created between the mould and the counter mould.

Once the mould and counter mould have been prepared as described, the pieces 4 which will form the upper are cut out, FIG. 3. These cut pieces will have a specific outline, corresponding to the desired footwear design; the edges 5 of these cuts of material are also sheared, preferably on the base side 7. Following this, the cut pieces are placed on the inner surface of part 1 of the mould, with the upside 7' facing the surface of said mould and the various cut pieces are arranged consecutively with their sheared edges 5 touching completely, as illustrated in FIG. 4.

Once all the cut pieces 4 which will form the upper are placed, the last 3 which shapes the counter mould is coupled to the base side, thus outlining channels 6, FIG. 4 with the sheared edges 5 of the cut pieces 4 which remain in contact with one another and also with spaces 8, FIG. 2, without cut pieces 4, delimited between part 1 of the mould and the last 3, as well as with the space 9 created between this last and part 2 of the mould, which correspond to space required for the sole or bottom of the footwear.

Figure 5:
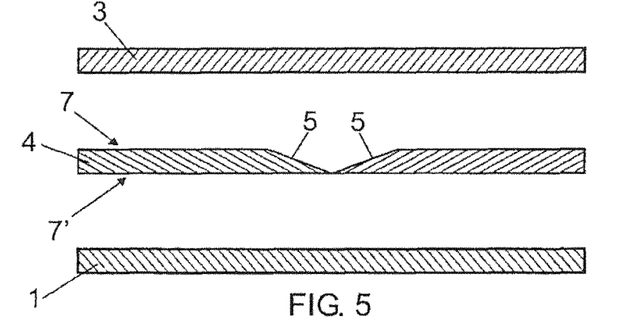
FIG. 5 is a schematic section of the mould position, the cut pieces which form the upper and the counter mould during the placement process for the various components, before closing the mould.
Figure 6:
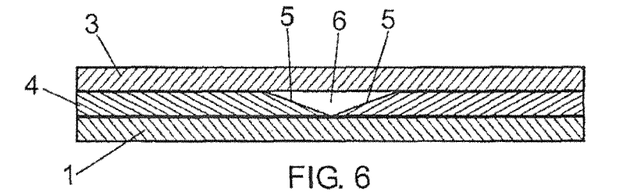
FIG. 6 is a schematic section, similar to FIG. 5, representing the position of the various components once the mould is closed.
Figure 8:
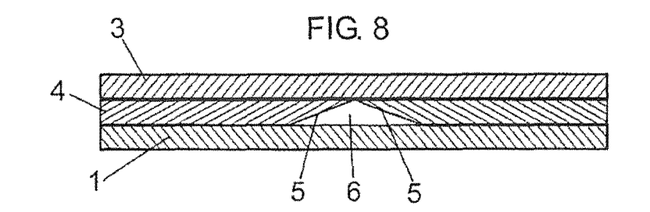

FIGS. 5 and 6 are schematic representations of the relative position of the various components, prior to closing the mould. The cut pieces 4 which will form the upper are placed on the inner surface of the mould 1, upside 7' facing the mould. The sheared edges 5 of the cut pieces 4 are completely touching or very close together. On the base side 7 of cut pieces 4, the last 3 or counter mould are coupled. FIGS. 6 and 8 represent the position of the various components, once the mould (1) and counter mould (3) have been coupled, thus delimiting channels (6) between the cut pieces (4) mould (1) and counter mould (3), through which the plastic material will be injected.

Figure 9:
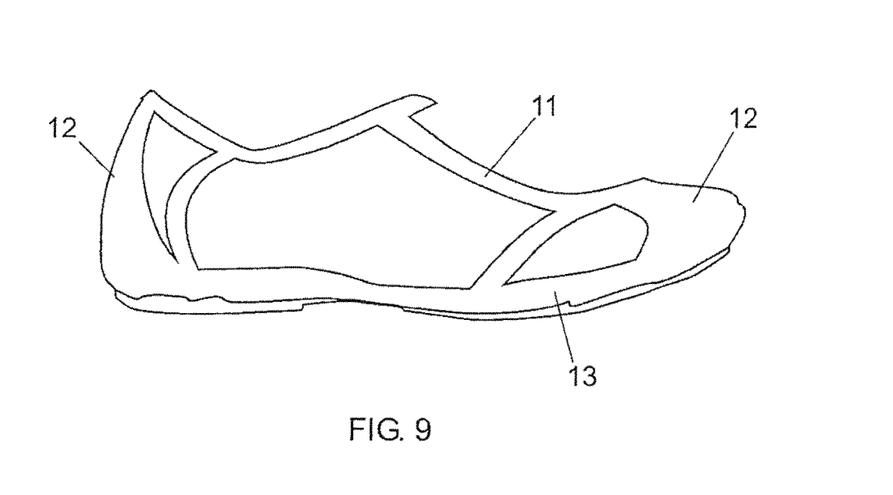
FIG. 9 represents the structure or skeleton of the footwear produced following the invention process, without the cut pieces which form the upper.

Once the last 3 has been coupled inside the mould 1 and the mould 1 is closed by part 2, FIG. 2, a plastic material which will fill the channels 6 and spaces 8 and 9 is injected, forming an armour or skeleton, as shown in FIG. 9, which consists of ridges 11 corresponding to the volume of the channels 6, the parts 12 which correspond to the volume of spaces 8 in FIGS. 2 and 4 and the sole or bottom 13 which corresponds to the volume of space 8 between the last 3 and the mould closure 2.

Figure 10:
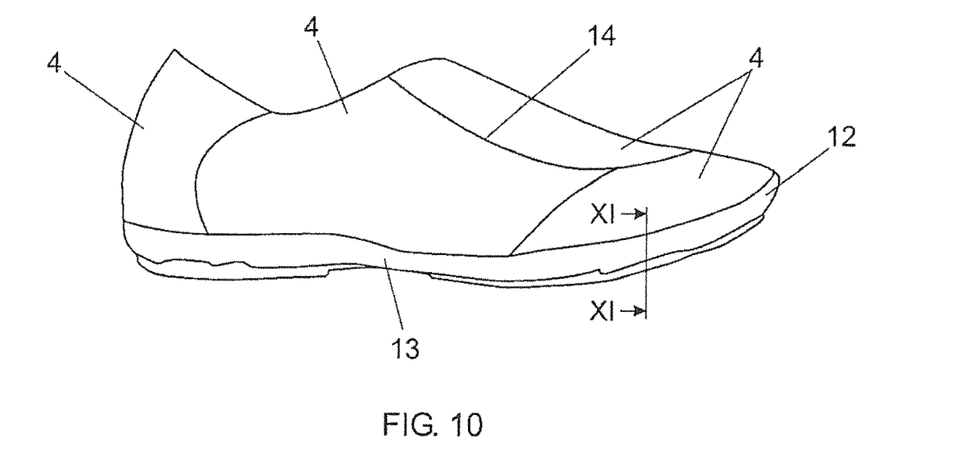
FIG. 10 is a side view of the footwear produced following the invention process, with the structure or skeleton represented in FIG. 7.

Once the plastic has been injected, the mould is opened and the footwear and the last are taken out, thus producing an item of footwear as shown in FIG. 10, which comprises the cut pieces 4 initially placed inside the mould and joint together by the ridges 11 of the injected plastic material, said footwear including the sole 13 and the toe and stiffener which correspond to the areas or bodies 12.

If the cut pieces 4 which form the upper are placed in the last with their edges touching, only those narrow lines 14 separating the cut pieces 4 will be visible on the outer surface of the footwear. Whereby the cut, pieces 4 forming the upper are separated slightly when placed in the last, the cuts 4 will be separated by ridges made of the injected plastic material in the footwear item produced, as shown in the figures. The width of these ridges corresponds to the extent to which these cut pieces 4 are separated when they are arranged in the mould.

Figure 7:
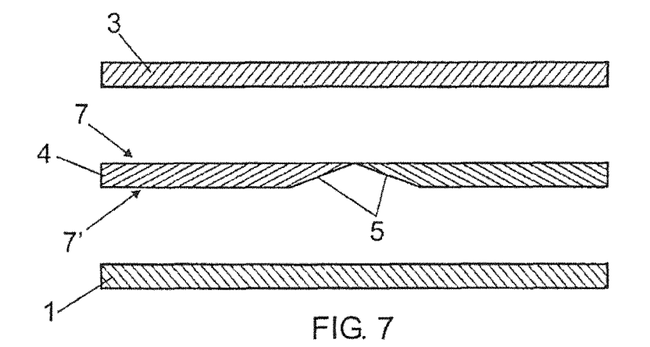
FIGS. 7 and 8 are schematic sections, similar to FIGS. 5 and 6, representing an alternative implementation.

The sheared edges of the cut pieces 4 which form the upper may also be made on the upside 7 of the material, as illustrated in FIGS. 7 and 8. In this case the channels 6 will be delimited between the shearing 5 and the inner surface of part 1 of the mould. In this embodiment, bands will appear on the visible surface of the footwear produced, which correspond to the width of the channels 6 separating the cut pieces 4 which form the upper, as shown in FIG. 8.

As already indicated, the nature of the plastic material injected may be such that the ridges 11 created are flexible and partially elastic, the footwear produced thereby being more capable of moulding itself to the surface of the foot and to the changes that occur in the foot when the footwear user walks, especially at the joints.

The cut pieces 4 may be stuck to the inner surface of the mould with an adhesive substance or even using a suction system, through holes which lead to the inner surface of the mould 1.

In order to ensure that the injected plastic material sticks perfectly to the sheared edges of the cuts 4 which form the upper, an adhesive compatible with the plastic material to be injected may be applied to the sheared edges 5 of the cut pieces 4 prior to the plastic material being injected.

For the purposes of decoration and reinforcement only, certain adjacent cut pieces may be joined together prior to the injection of the plastic material using seams.

Figure 11:
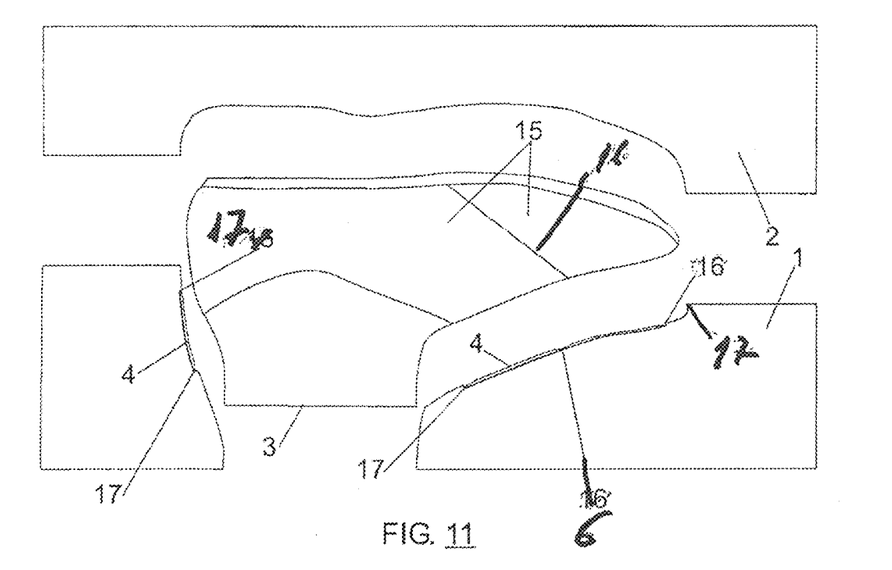
FIG. 11 represents a similar view to FIG. 2, including those cut pieces which form the lining, located on the counter mould.

The footwear lining may also consist of cut pieces 15, FIG. 11, in the same way as described for the upper. These cut pieces 15 are arranged on the last 3 using any of the abovementioned methods. The number of cut pieces 15 making up the lining may be equal to or less than the number of cut pieces 4 forming the upper but, the lines 16 separating the lining cut pieces will preferably coincide with the channels 6 separating the cut pieces 4 which form the upper in such a way that, the injected plastic material, which will form the binding ridges 11 between the cut pieces 4 of the upper, also serves to bind the cut pieces 15 which form the lining and to bind these cut pieces to the upper. A seamless lining would thus be created and the plastic ridges binding the cut pieces of the upper and the lining would be hidden between the lining and the upper.

FIG. 11 also illustrates the mould's peripheral ridges 17 which would determine the surface upon which the cut pieces 4 of the upper would be placed.

Figure 12:
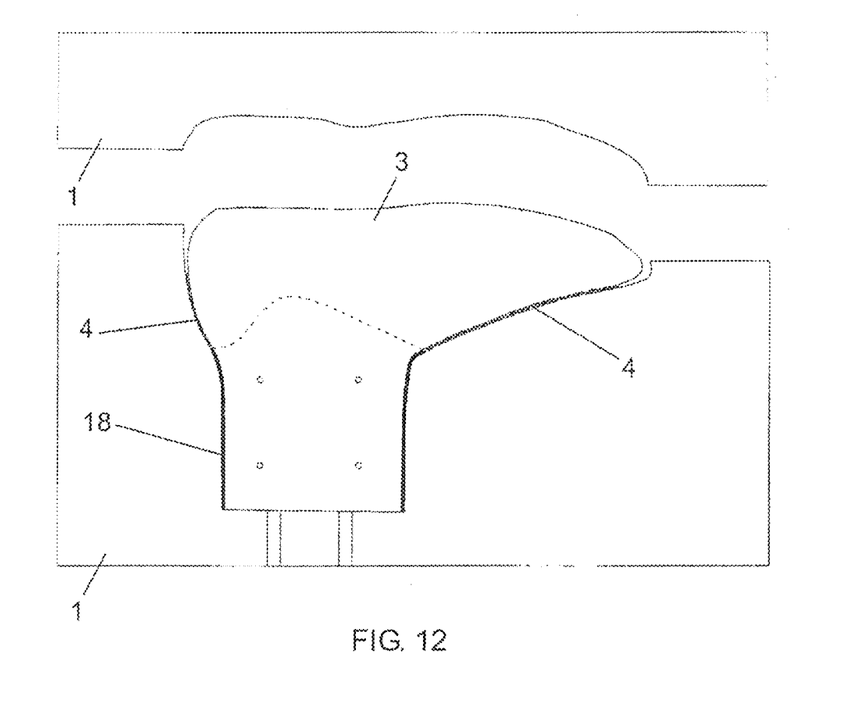
FIG. 12 represents a similar view similar to FIG. 2, representing an alternative implementation.

As shown in FIG. 12, part of the volume delimited between the mould 1 and the last 3 may be occupied by an attachment or filler part 18 which limit the volume allocated to the cut pieces 4 which will form the upper. Therefore, when the mould 1 and counter mould 3 are used without the filler part 18, a boot style item of footwear can be produced. Conversely, when the filler part 18 is inserted, a shoe shaped item of footwear will be produced. This makes it possible to use one single mould to fabricate various footwear models.

Figure 13:
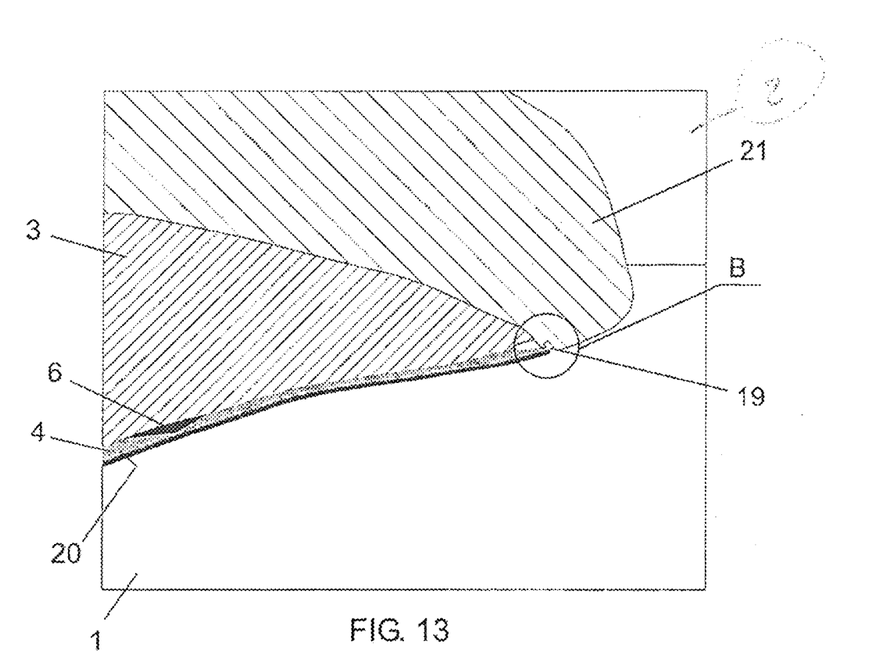
FIG. 13 represents a similar view to FIG. 4, showing the ridge in the counter mould which delimits the surface to receive the liquid plastic.
Figure 14:
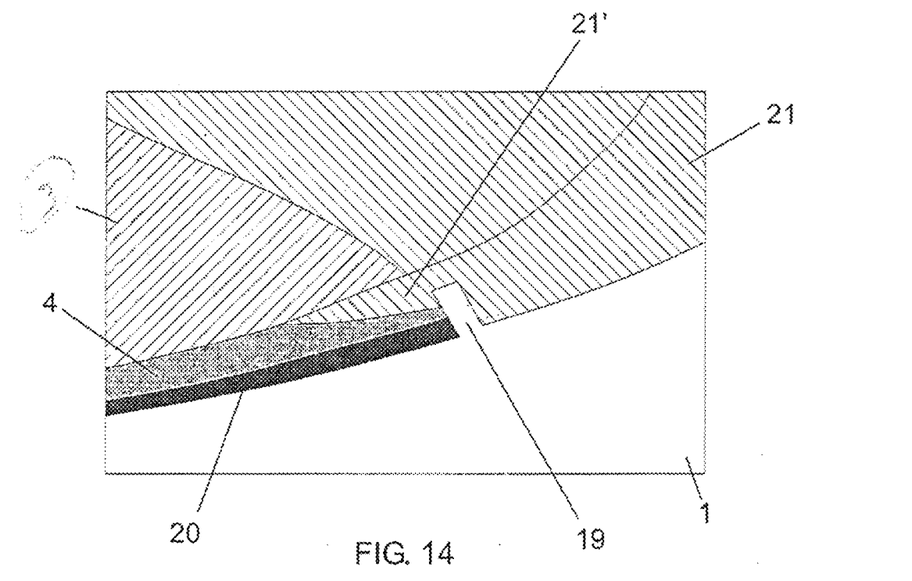
FIG. 14 is an enlarged representation of detail B in FIG. 14.

As shown in FIGS. 13 and 14, the surface intended to be filled with the plastic fluid for the sole may be limited by a ridge 19 pertaining to the mould 1, which is higher up than the depth of the adjacent edges of the cuts of leather 4. As already mentioned, these cuts of leather may be secured on a lamellar template 20 which facilitates the placement of the cut pieces 4 on the mould's 1 surface. The position of the ridge 19 enables the plastic fluid injected 21 for the sole to fall on the cut of leather 4 when it gets higher than the ridge itself, as illustrated in reference 21', FIG. 14. This pushes it towards the mould 1, thereby preventing this liquid from penetrating the leather face in contact with the mould.

Figure 15:
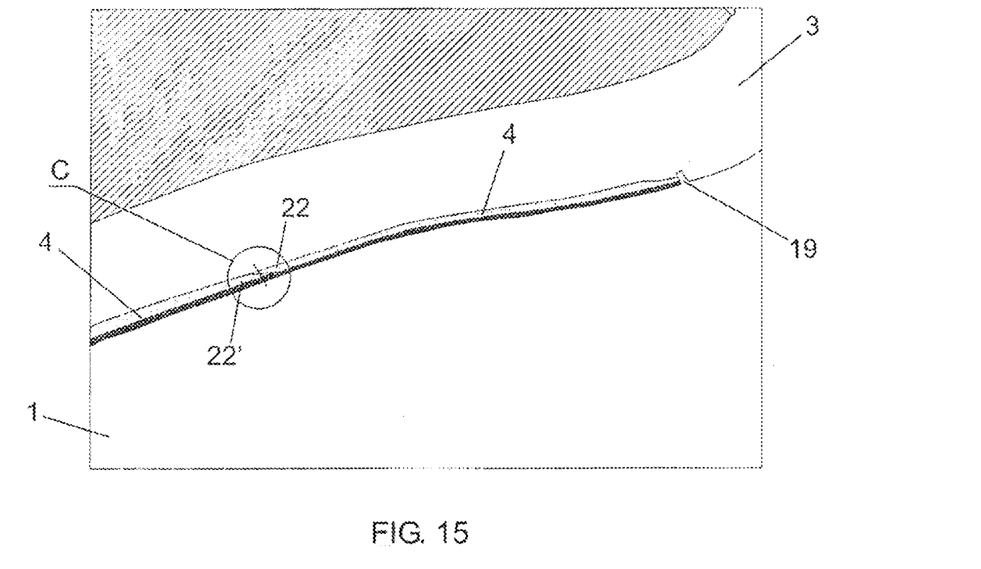
FIG. 15 represents the arrangement of the consecutive cut pieces which form the upper with their overlapping edges.
Figure 16:
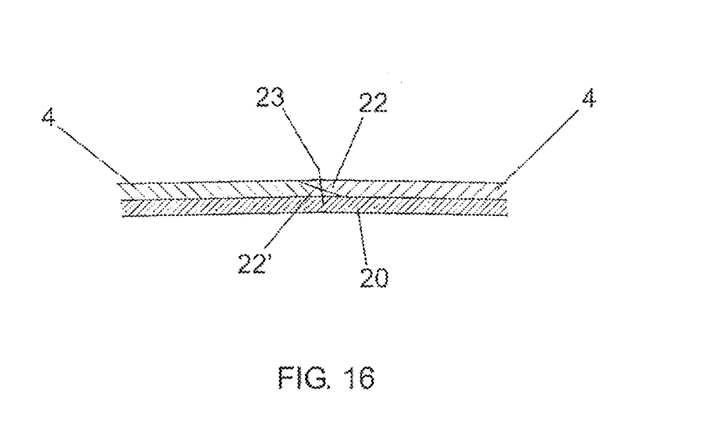
FIG. 16 is an enlarged representation of detail C in FIG. 15.

As shown in FIGS. 15 and 16, the opposing adjacent edges 22-22' of the consecutive cut pieces 4, which form the upper, may overlap and be bound together, for example by sewing 23 them; this would occur prior to introducing these cut pieces into the mould. The depth of these edges may be sheared in such a way that, when they overlap, their thickness virtually equals that of the cut pieces 4. This makes it possible to use the same mould to fabricate different footwear models.

FIGS. 17 to 25 are cross-sections of various possible types of binding between the cut pieces forming the outer material and lining of the item to be produced.

Figure 17:
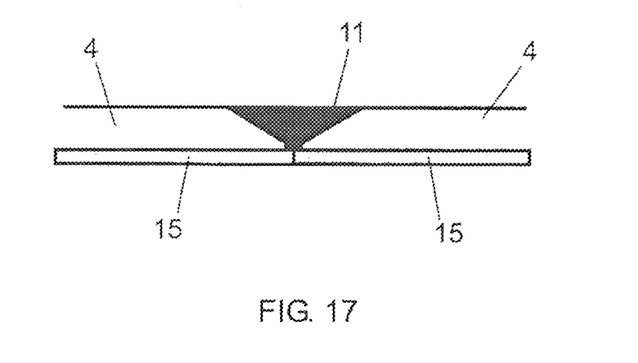
FIGS. 17 to 25 are cross-sections of various possible types of binding between the cut pieces which form the outer material and lining.

FIG. 17 shows how the cuts of leather 4 and the cut pieces 15 which form the lining are bound together by the ridges 11 created by the plastic material when it is injected. The cuts of leather 4 are arranged with their sheared edges slightly separated from one another.

Figure 18:
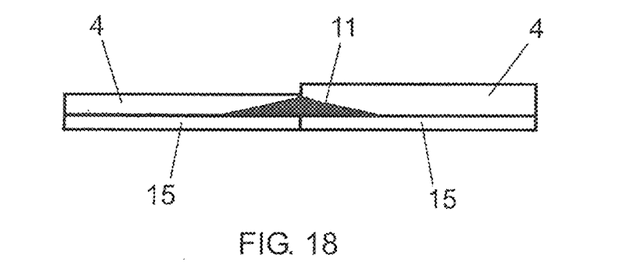

FIG. 18 illustrates one possible embodiment in which the cuts of leather 4-4' vary in depth. This will only be noticeable on the outer surface of the footwear or garment produced.

Figure 19:
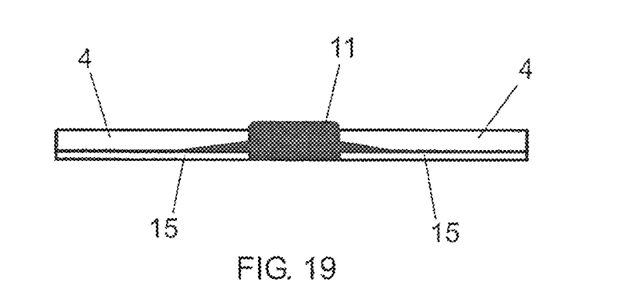
Figure 20:
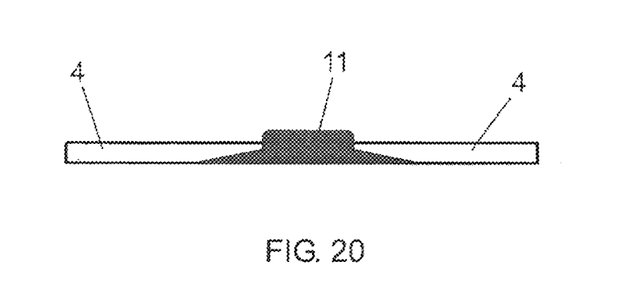

FIGS. 19 and 20 illustrate that the ridges 11 may protrude from the outer surface of the footwear or garment produced for decorative purposes and to provide elasticity in flexible areas of the footwear or garment. In both cases, the edges of the cuts of leather 4 are sheared, without lining as shown in FIG. 20 whereas the cut pieces 15 which form the lining are also bound by the ridges 11, as shown in FIG. 19.

Figure 21:
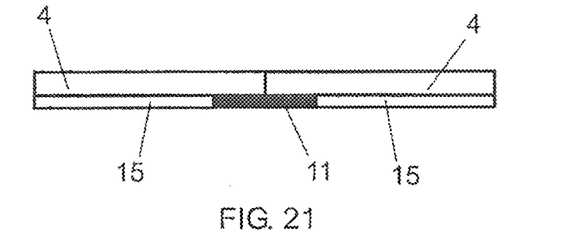

In FIG. 21 the ridges 11, which serve to bind the cut pieces 4 of plastic material and the cut pieces 15 which form the lining, will be formed by the channels delimited between the cuts of leather 4 and the counter mould, by partially separating the cut pieces 15 which form the lining. This embodiment applies to cut pieces 4 whose edges cannot be sheared.

Figure 22:
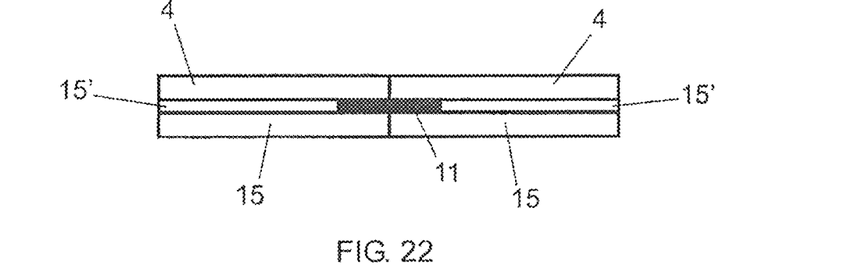

In the same conditions, an outer material composed as illustrated in FIG. 22 may be produced, whereby the ridges 11 are limited between the cut pieces 4 of the outer material and the cut pieces 15 of the lining by partially separating the intermediate cut pieces 15', which have a textile or foam backing, for example.

Figure 23:
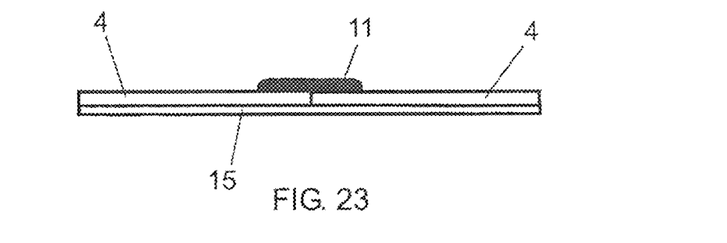
Figure 24:
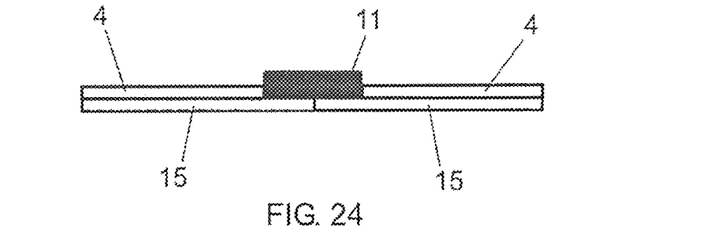
Figure 25:
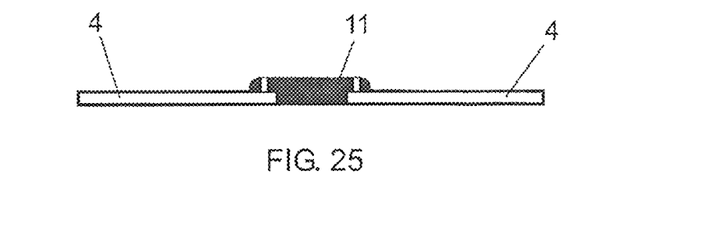

FIG. 23 shows an alternative, which may also be applied to the cut pieces 4, which form the outer material whose edges cannot be sheared and in which the ridges 11 will be created by ridges or channels formed in the inner surface of the mould. Similarly, the mounting systems, illustrated in FIGS. 24 and 25, may be obtained; in the latter case, the outer material has no lining. In both cases, the ridges protrude from the outer surface of the outer material for decorative purposes and to provide elasticity at the flex points.

Figure 26:
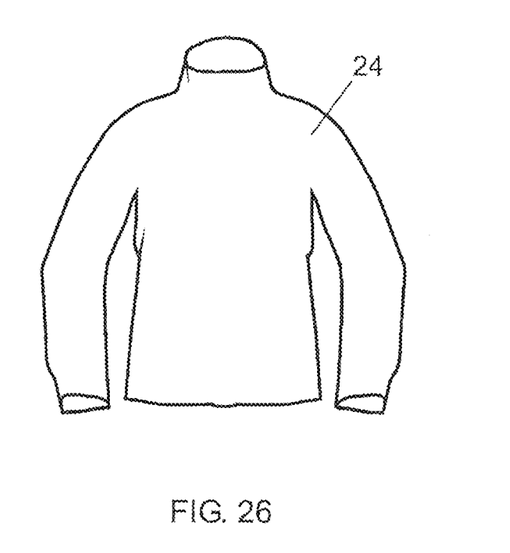
FIG. 26 represents a counter mould used to produce an item of clothing.
Figure 27:
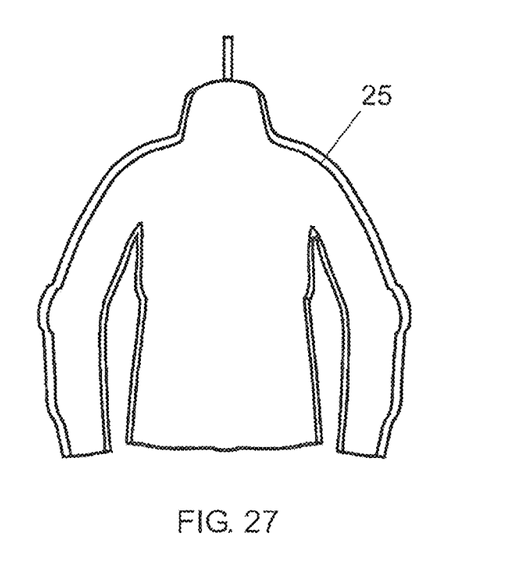
FIGS. 27 and 28 represent the two parts of a mould used to produce an item of clothing, with the counter mould in FIG. 26.
Figure 28:
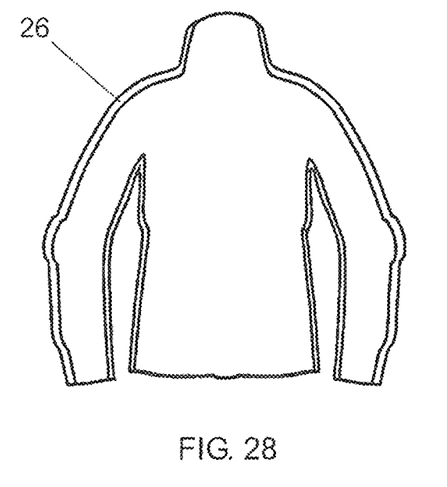
Figure 29:
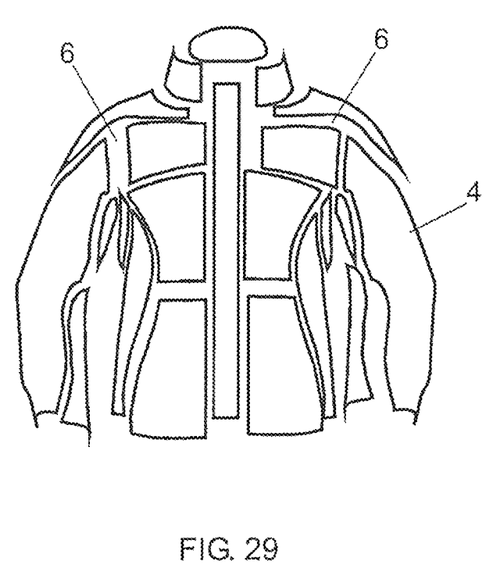
FIG. 29 represents the aggregate of cut pieces which will form the outer material of the clothing to be produced, with the mould and counter mould in FIGS. 26 to 28.
Figure 30:
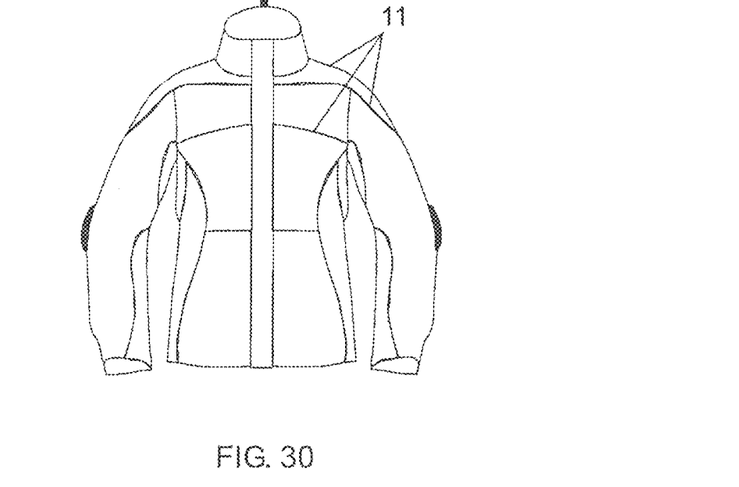
FIG. 30 is a schematic of the network of channels through which the plastic material will injected.
Figure 31:
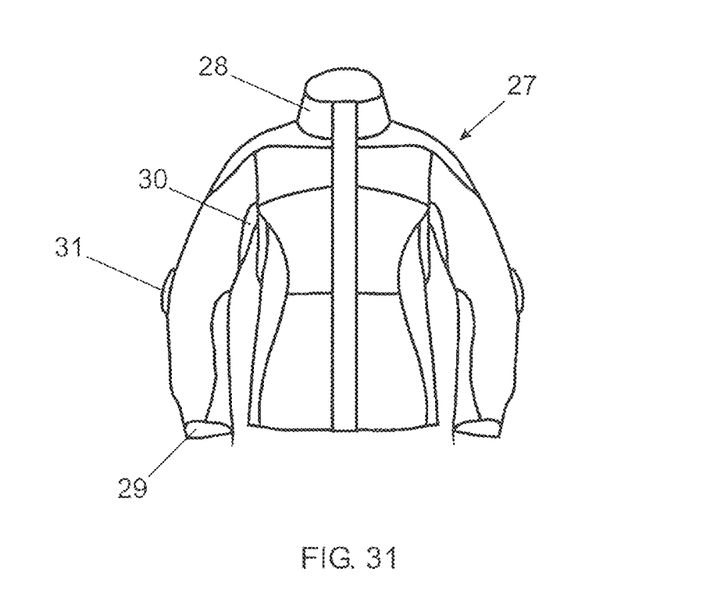
FIG. 31 is a front elevation of the clothing produced using the mould in FIGS. 26 to 28.

FIG. 26 represents a counter mould 24 which, alongside components 25 and 26, FIGS. 27 and 28, which shape the mould, makes it possible to produce the item of clothing 27 represented in FIG. 31. FIG. 29 shows the arrangement of the cut pieces 4, which form the outer material, with the separations which determine the channels 6 delimited between components 25 and 26 of the mould and the counter mould 24 and which enable the structure or skeleton of the ridges 11 to be produced, as shown in FIG. 30, which in turn serve to bind the cut pieces 4.

Certain parts or areas of the garment 27 produced may be more bulky than others, for example areas pertaining to the collar 28 and the cuffs 29. Moreover, the garment may have areas reinforced using the abovementioned methods. This applies to areas 30, the underarms and especially to areas 31, the elbows, for example.

The invention claimed is:

1. Manufacturing process for the production of flexible three-dimensional items, made from an outer material formed by flat cuts of flexible material comprising:
   cutting pieces of flexible material, which form the outer material;
   preparing a mold and a countermold, between which a volume corresponding to that of the three-dimensional item is delimited;
   placing the cut pieces, which form the outer material, between the mold and countermold delimiting channels and spaces between them;
   injecting a plastic material through the channels and spaces; and
   opening the mold once the plastic material injected has solidified and then removing the item produced,
   wherein:
   the cut pieces, which form the outer material, are secured on a flexible laminated template, in a position where the cut pieces match with the outer material of the flexible three-dimensional item produced;
   the mold and countermold have opposing surfaces without ridges in areas occupied by the cut pieces which form the outer material of the item produced;
   the laminated template together with the cut pieces which form the outer material, are arranged on an inner surface of the mold, with said cut pieces facing the countermold; and a network of channels, through which the plastic material is injected, is delimited between the laminated template and the countermold, coinciding with the channels and spaces, which separate the cut pieces which form the outer material.

2. Process according to claim 1, wherein the cut pieces forming the outer material have sheared edges.

3. Process according to claim 1, wherein the three-dimensional item further comprises a lining formed by separate cut pieces, which are arranged on the surface of the countermold.

4. Process according to claim 3, wherein lines separating cuts of leather and the cut pieces which form the lining coincide, the injected plastic material serving to bind the cuts of leather and the cut pieces which form the lining.

5. Process according to claim 4, wherein the surface of the mold corresponding to the outer material is delimited by a ridge with a height greater than the depth of adjacent edges of the cuts of leather.

6. Process according to claim 3, wherein the cut pieces which form the lining are secured on a laminated template in a matching position to the lining formation, and the template then takes on the form of the surface of the countermold.

7. Process according to claim 6, wherein the cut pieces which form the outer material and lining are secured on the laminated template with adhesive.

8. Process according to claim 7, wherein part of a volume delimited between the mold and countermold is occupied by a filler, which limits the volume allocated to the cut pieces which form the outer material and lining.

9. Process according to claim 3, wherein on the surface of the countermold and/or inner surface of the lining, a substance which repels the injected plastic material is applied.

10. Process according to claim 6, wherein the laminated template on which the cut pieces which form the lining are secured consists of an electrostatically charged sheet or film made of plastic material.

11. Process according to claim 1, wherein the flexible laminated template on which the cut pieces which form the outer material are secured consists of an electrostatically charged sheet or film made of plastic material.

12. Process according to claim 1, wherein on the surface of the mold and/or the inner surface of the laminated template on which the cut pieces forming the outer material are arranged, a substance which repels the injected plastic material is applied.

* * * * *